United States Patent [19]
Asano et al.

[11] Patent Number: 5,519,882
[45] Date of Patent: May 21, 1996

[54] SYSTEM FOR CONFIGURING A DISK DRIVE AS A MASTER OR SLAVE BY EITHER CABLE OR LOCAL SELECTION WITH ONLY ONE JUMPER BLOCK OR ONE SWITCHING DEVICE

[75] Inventors: Hideo Asano, Machida; Masayuki Murakami, Fujisawa; Keisuke Shimomura, Yokohama, all of Japan

[73] Assignee: International Business Machines Corporation, Armonk, N.Y.

[21] Appl. No.: 205,971

[22] Filed: Mar. 3, 1994

[30] Foreign Application Priority Data

Mar. 4, 1993 [JP] Japan ................................ 5-044051

[51] Int. Cl.⁶ .............................. G06F 9/00; G06F 13/00
[52] U.S. Cl. ................ 395/830; 395/831; 395/775; 364/243; 364/243.7; 364/245; 364/245.31; 364/245.4; 364/246; 326/38
[58] Field of Search ................................. 395/830, 831, 395/834, 500, 775, 800; 326/38

[56] References Cited

U.S. PATENT DOCUMENTS

| 4,907,105 | 3/1990 | Kurzweil, Jr. ................ 360/73.02 |
| 5,023,831 | 6/1991 | Bonke et al. ................... 364/900 |

OTHER PUBLICATIONS

Pastrick, "The Second Step: Making the Buy", *PC Magazine*, Jul., 1993.
Rosch, "Maxed Out?Add a New Hard Drive", *PC Sources*, Dec., 1992.

Working Draft Proposed American National Standard for Information Systems–ATA, Rev. 3.2, dated Oct. 16, 1992.

*Primary Examiner*—Thomas C. Lee
*Assistant Examiner*—Marc K. Weinstein
*Attorney, Agent, or Firm*—Richard E. Billion

[57] ABSTRACT

An object of the present invention is to specify two disk drive apparatuses which are connected to an AT interface as a master or slave HDD for local or cable selection by only one jumper block. A disk drive apparatus connected to data processing means through a plurality of interface lines including one interface line connected to a first voltage level of said data processing means, including:

- a plurality of connection points connected respectively to said plurality of interface lines,
- a first connection point capable of being selectively connected to said one interface line,
- a second connection point kept at a floating voltage,
- a third connection point tied to the first voltage level,
- a fourth connection point tied to a second voltage level and selectively connected to one of said first, second, and third connection points, and
- control means connected to said fourth connection point and recognizes itself as a first or second disk drive apparatus by detecting a voltage level of the fourth connection point.

12 Claims, 9 Drawing Sheets 5,519,882

SYSTEM FOR CONFIGURING A DISK DRIVE AS A MASTER OR SLAVE BY EITHER CABLE OR LOCAL SELECTION WITH ONLY ONE JUMPER BLOCK OR ONE SWITCHING DEVICE

BACKGROUND OF THE INVENTION

An AT interface has been used hitherto as one of interfaces for connecting a personal computer and a hard disk drive (HDD). For the AT interface, as shown in FIG. 11, connectors 82 and 83 for two HDDs are connected in a daisy chained configuration to an interface connector 81 for a personal computer, and one HDD serves as a master HDD and the other HDD as a slave HDD. The AT interface defines forty interface lines. Actually, in addition to the forty interface lines, four power lines may be added. FIG. 11 shows forty four lines #1 to #44, which are called interface lines. An HDD has at least a hard disk for storing information, a read/write head, a spindle motor for rotating the hard disk, and a circuit board. Provided on the circuit board are at least a read/write circuit, a head driving circuit, a motor driving circuit, an interface circuit, a control circuit for controlling these circuits, and the connector 82 (or 83) connected to the interface lines.

To use one HDD as a master HDD or a first HDD and the other HDD as a slave HDD, or a second HDD, control signals indicating a master and a slave must be supplied to controllers for two HDDs. When a controller detects the control signal indicating a master, that HDD operates as a master HDD. On the other hand, when a controller detects the control signal indicating a slave, then that HDD operates as a slave HDD.

There are two methods of supplying a control signal indicating a master or a slave to a controller for an HDD. A first method is to equip the HDD with switch means to supply a signal indicating a master (for example, a low-voltage level signal) or a signal indicating a slave (for example, a high-voltage level signal) to the control circuit on the HDD. Such selection by the switch means, which is independent of the interface lines, is called local selection. Pins #45, #46, #47, and #48 shown in FIG. 11 serve as the switch means for local selection. The pins #45 to #48 are not connected to the interface lines.

In the following, the construction of the connectors 82 and 83 is described in further detail. A construction of the connector 83 is the same as that of the connector 82. FIG. 12 shows the construction of the connector and a jumper plug. Showed in FIG. 15 is the electrical connection of the pins #45 to #48.

The pins #45 and #46 are electrically floating, that is, are not tied to any voltage, and accordingly a voltage at the pin #45 and #46 is referred to as a floating voltage. The pin #47 is tied to a reference potential, for example, a ground potential, and the pin #48 is tied to a potential (for example, +5 V) different from the reference potential through a line 90 and a resistance 91. The controller for an HDD determines whether the HDD was specified as a master HDD or a slave HDD by detecting a potential at a terminal 92. The specification of master HDD is implemented through the selective connection of two pins #47 and #48 by an operator or a user, and the specification of slave HDD is implemented by keeping two pins #47 and #48 from their connection.

Referring to FIG. 13 and FIG. 14, a jumper block 93 is used to connect the pin #47 and the pin #48. The jumper block 93 is made of an insulating material and includes conductive accept members, that is, a first and second jumper connections 94 and 95, which accept the pins, and a conductor 96 for electrically connecting the accept members 94 and 95 to each other. As shown in FIG. 13, the pins #47 and #48 are connected when the jumper plug 93 is inserted into the pins #47 and #48 by the operator, thus the terminal 92 is tied to the reference potential (a low voltage level). The controller for the HDD detects the low voltage level, and thereby the HDD serves as a master HDD.

As shown in FIG. 14, when the jumper block 93 is inserted into the pins #45 and #46, a potential at the terminal 92 is +5 V and then the controller for the HDD detects a high voltage level, and thereby the HDD serves as a slave HDD.

A second method follows cable selection determined based on the AT Attachment Specification of American National Standard for Information Systems. In the second method, a potential at the interface line #28 shown in FIG. 11 specifies a master or slave. The interface line 28 of the connector 81 for the personal computer is tied to the reference potential (0 V), as shown in FIG. 11.

The connector 83 is kept from being tied to the reference potential by the user, as indicated by a dotted line 80. That is, a voltage at a pin #28 of the connector 83 is open, that is, floating. This open voltage represents a slave, and accordingly the controller for the HDD connected to the connector 83 recognizes itself as a slave by detecting the voltage at the pin #28.

The pin #28 of the connector 82 is tied to the reference potential, and accordingly the HDD connected to the connector 82 recognizes itself as a master by detecting the voltage at the pin #28.

To support both local selection and cable selection, two switch means are conventionally required. First switch means is necessary for selecting either local or cable selection, and second switch means is used for selecting either a high voltage level representing a slave or a low voltage level representing a master when local selection is selected by the first switch means. Such a conventional method involves the following problems. That is, a user must operate the first and second switch means, and a controller first determines to see whether an operation mode is local selection or cable selection by checking the output voltage of the first switch means, and must check a voltage at the interface line #28 if the first switch means was changed to the cable selection mode or check the voltage level of the second switch means if the first switch means was changed to the local selection mode to recognize a master or slave.

SUMMARY OF THE INVENTION

A disk drive apparatus according to the present invention is connected to a data processing means through a plurality of interface lines including one interface line tied to a first voltage level of the data processing means, and includes:

a plurality of connection points connected respectively to said plurality of interface lines, a first connection point capable of being selectively connected to said one interface line, a second connection point kept at a floating voltage, a third connection point connected to the first voltage level, a fourth connection point which is tied to a second voltage level and selectively connected to one of said first, second, and third connection points, and a controller connected to said fourth connection point and recognizes itself as a first or second disk drive apparatus by detecting a voltage level at the fourth connection point.

Said disk drive apparatus includes a connector having a plurality of connection points connected respectively to said plurality of interface lines, and said first, second, third, and fourth connection points are provided close to said plurality of connection points on said connector.

Said one interface line is one specified as a cable selection line in the AT Attachment Specification of American National Standard for Information Systems. Said first voltage level is a reference voltage level.

Said disk drive apparatus includes a circuit board and said first, second, third and fourth connection points, and said control means are provided thereon.

In a disk drive apparatus including a connector which has a plurality of connection points each connected to one end of each of a plurality of interface lines each of which is connected to the data processing means at the other end in which a plurality of said connection points include one connection point capable of being selectively connected to one end of one interface line the other end of which is tied to a first voltage level of said data processing means, said connector includes:

a first connection point connected to said one connection point, a second connection point kept at a floating voltage, a third connection point tied to the first voltage level, and a fourth connection point tied to a second voltage level, and said disk drive apparatus includes a jumper for connecting said fourth connection point to at least said first connection point or said third connection point and control means which is connected to said fourth connection point and recognizes itself as a first or second disk drive apparatus by detecting a voltage level at the fourth connection point.

Said first, second, third, and fourth connection points are formed by a first, second, third, and fourth connection pins, respectively, and said first, second, third, and fourth connection pins are provided close to said plurality of connection points.

Said jumper plug includes a first and second jumper connection points and a distance between said first and second jumper connection points is equal to a distance between said first and fourth connection pins and a distance between said third and fourth connection pins.

Said one interface line is one specified as a cable selection line in the AT Attachment Specification of American National Standard for Information Systems.

Said first voltage level is a reference potential.

In a personal computer which is connected to a disk drive apparatus through a plurality of interface lines including one interface line tied to a first voltage level, said disk drive apparatus includes a plurality of connection points connected to a plurality of said respective interface lines, a first connection point capable of being selectively connected to said one interface line, a second connection point tied to a floating voltage, a third connection point tied to a first potential, a fourth connection point tied to a second potential, and a controller which is connected to said fourth connection point and recognizes itself as a first or second disk drive apparatus by detecting a potential at said fourth connection point, and said personal computer is connected to said first, second, third, and fourth connection points, and includes connection means for connecting the fourth connection point to said first, second, or third connection point.

According to the present invention, one jumper block or one switching device enables the specification of a master and a slave for local selection and cable selection.

DETAILED DESCRIPTION OF THE PREFERRED EMBODIMENT

A disk drive apparatus includes at least a hard disk for storing information, a read/write head, a spindle motor for rotating the hard disk, and a circuit board. Provided on the circuit board are at least a read/write circuit, a head driving circuit, a control circuit, for example, MPU for controlling these circuits, an interface circuit, and a connector connected to interface lines. Being well known to those skilled in the art, they are not shown except for the connector.

Figure 1:
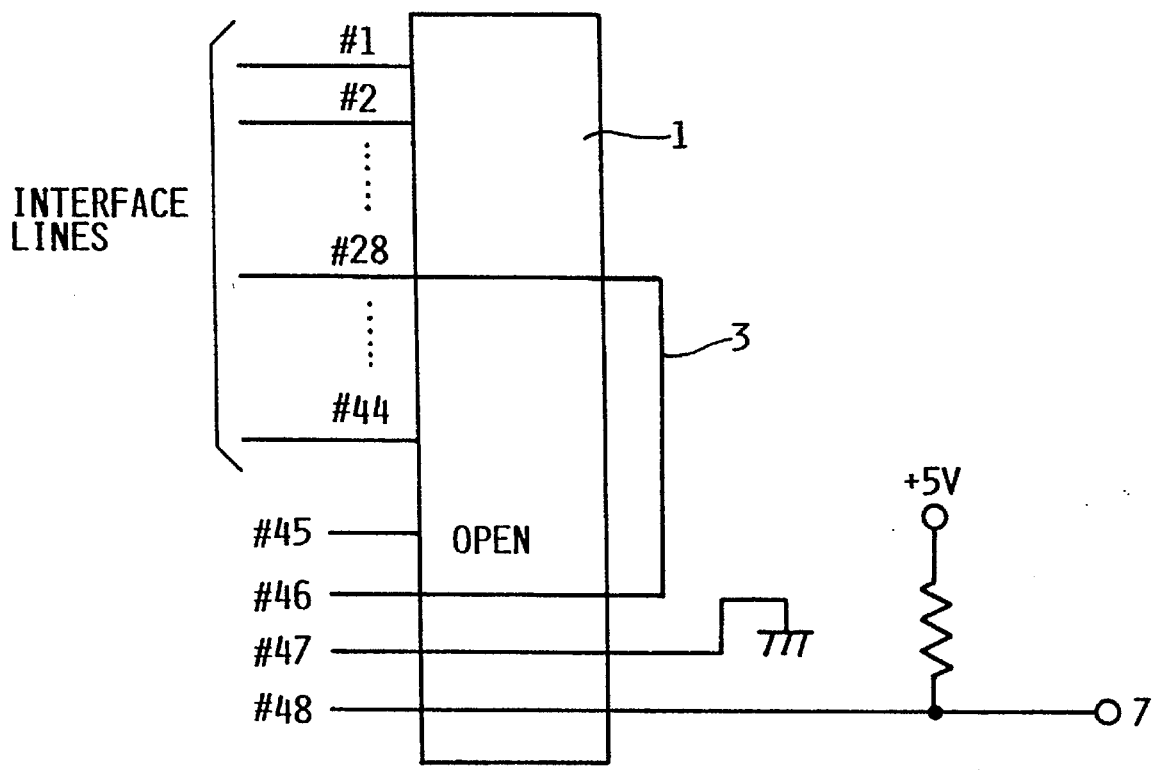
FIG. 1 is a diagram showing the connection of a connector according to the present invention.
Figure 2:
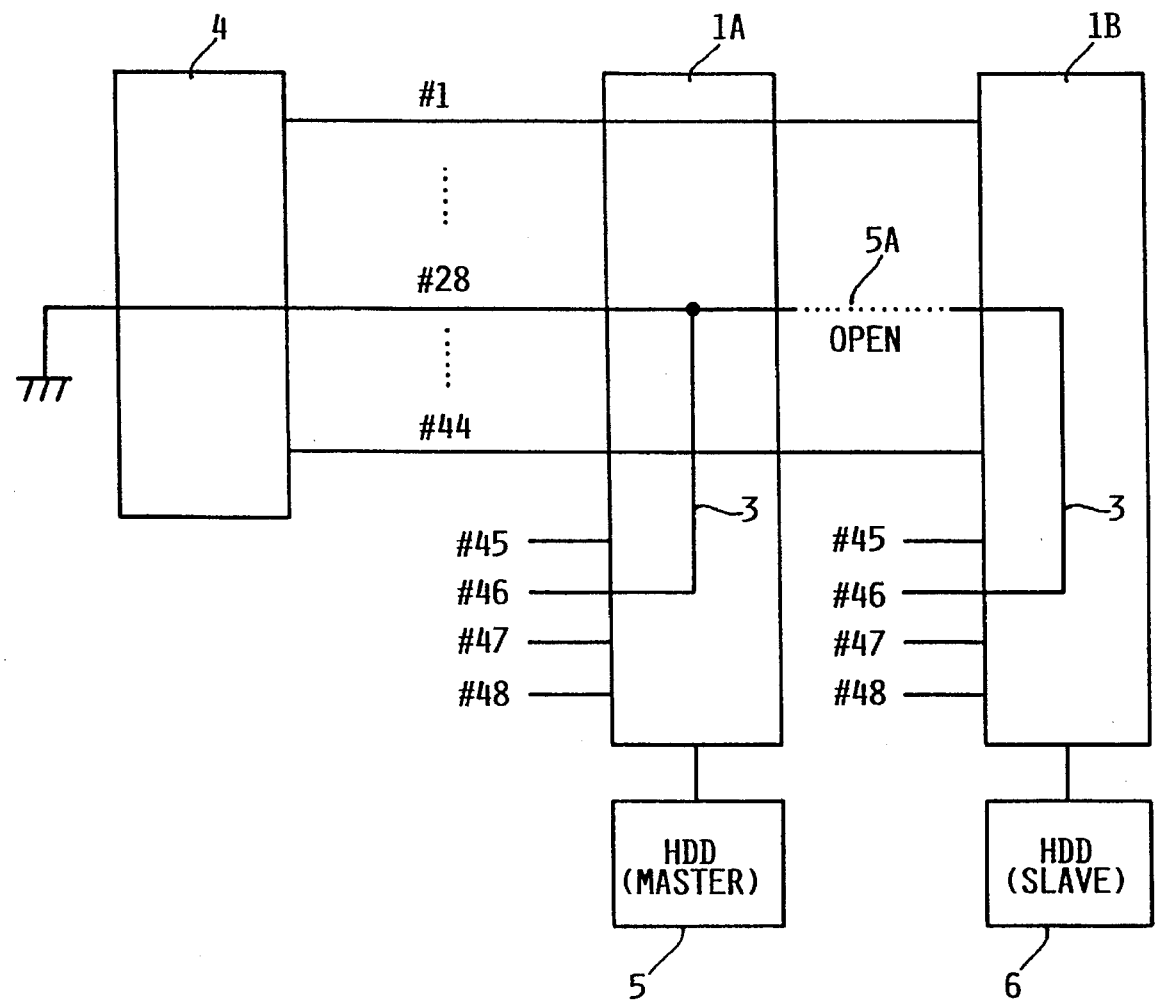
FIG. 2 is a diagram showing the connection using connectors according to the present invention.
Figure 11:
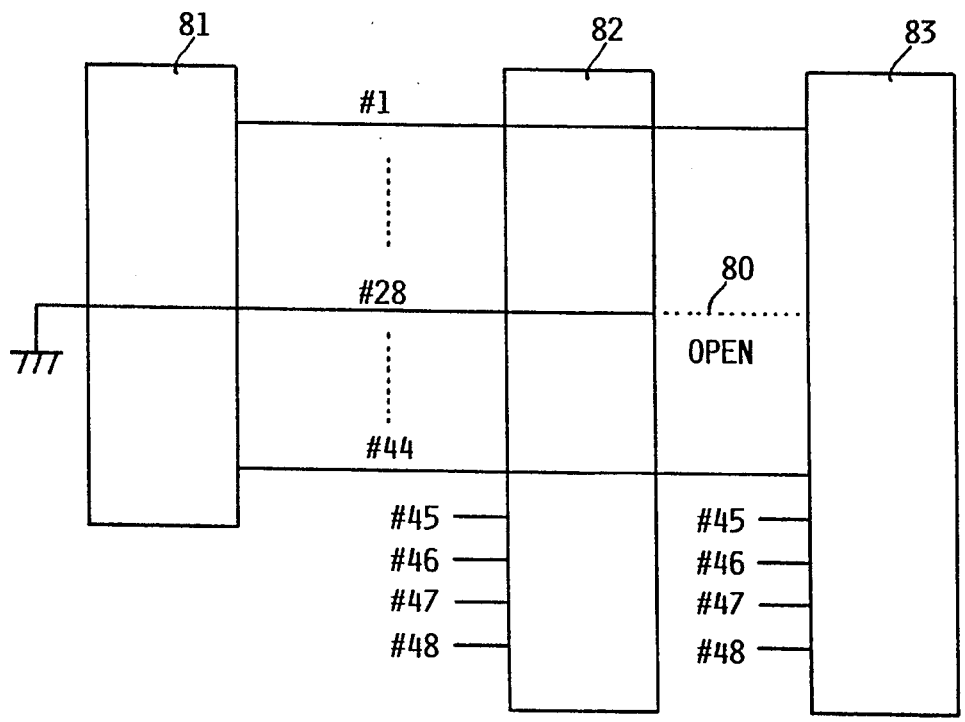
FIG. 11 is a diagram showing conventional connection.
Figure 15:
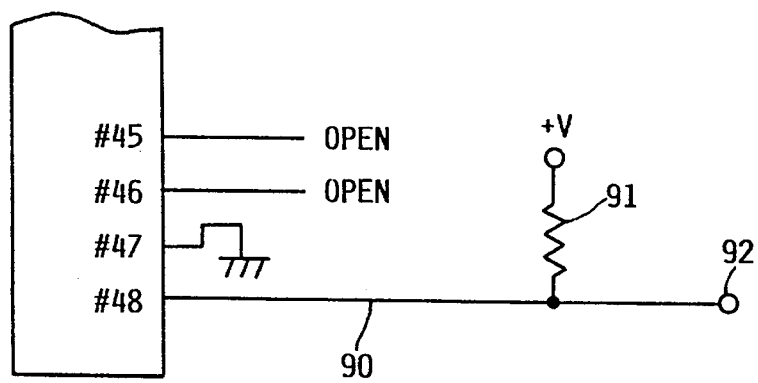
FIG. 15 is a diagram showing conventional connection.
Figure 12:
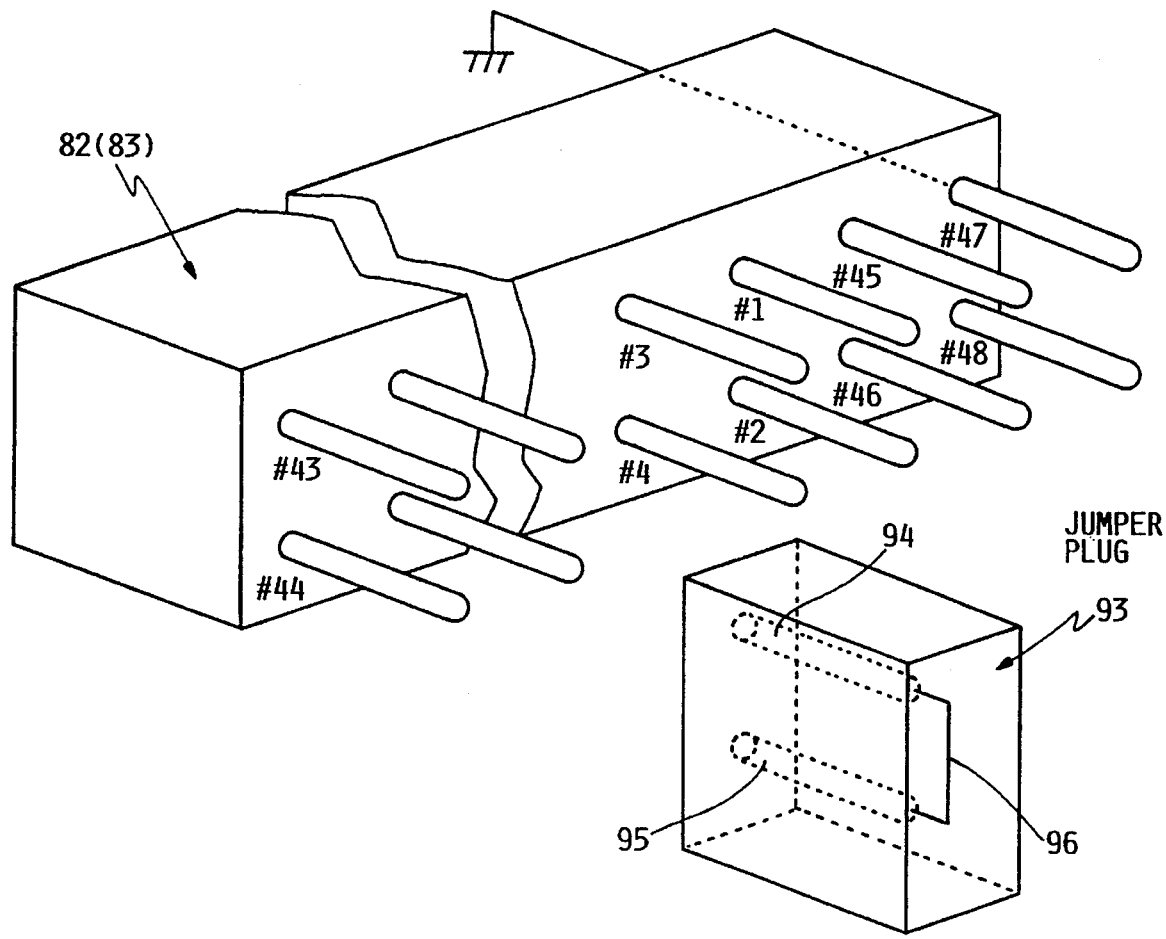
FIG. 12 is a diagram showing a conventional connector.
Figure 13:
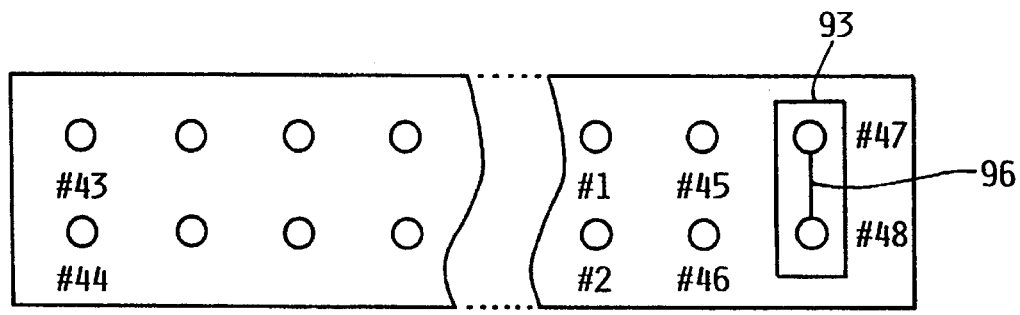
FIG. 13 is a diagram showing conventional connection.
Figure 14:
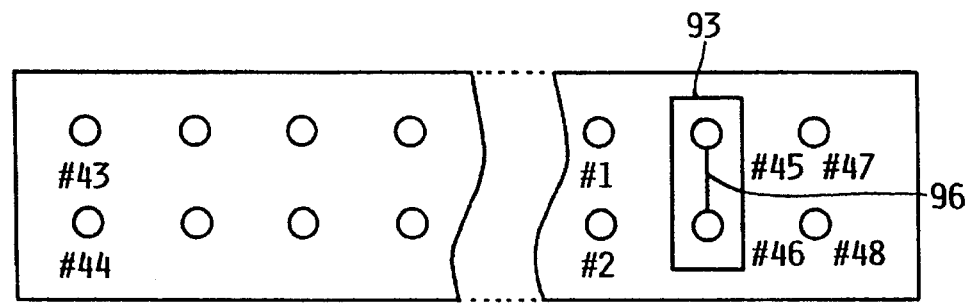
FIG. 14 is a diagram showing conventional connection.

FIG. 1 shows a connector 1 according to the present invention. The number of pins and their arrangement in the connector 1 are much the same as in the conventional connector 82(or 83) shown in FIG. 12. The connector 1 of FIG. 1 according to the present invention differs from the conventional connector of the FIG. 12 in that a pin #28 for cable selection and a pin #46 for local selection are connected to each other through a connection line 3 in the connector 1 according to the present invention. As shown in FIG. 2, the connector 1 is used instead of two connectors 82 and 83 in daisy chained connection with the AT interface shown in FIG. 11. In FIG. 2, connectors 1A and 1B are connected to HDDs 5 and 6, respectively.

An interface line #28 to the connector 1B is disconnected by a user, as indicated by a dotted line 5A, and accordingly a potential at the pin #28 of the connector 1B becomes an open potential. The interface line #28 of an AT interface connector 4 for a personal computer is tied to a reference potential. The connector 1 provides pins, or connection points #1 to #44 connected to interface lines #1 to #44, respectively. Pins #45 to #48 are not connected to the interface lines.

The connector 1 according to the present invention enables the specification of a master and a slave by only one jumper plug in both local selection and cable selection. The jumper plug is the same as the conventional jumper plug 93 shown in FIG. 12.

Figure 3:
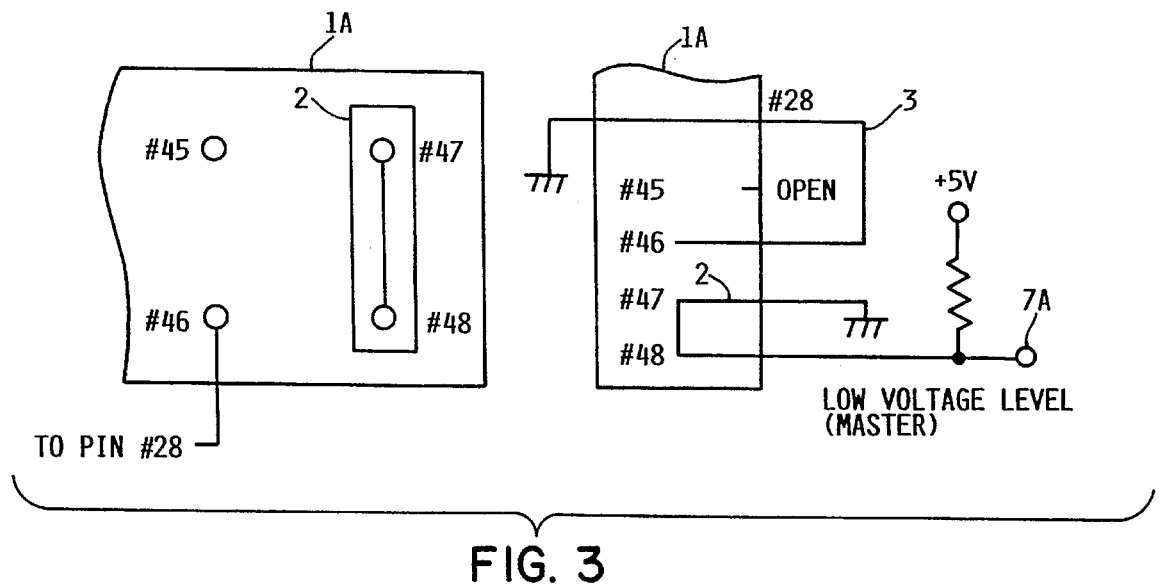
FIG. 3 is a diagram showing the specification of master for local selection according to the present invention.
Figure 4:
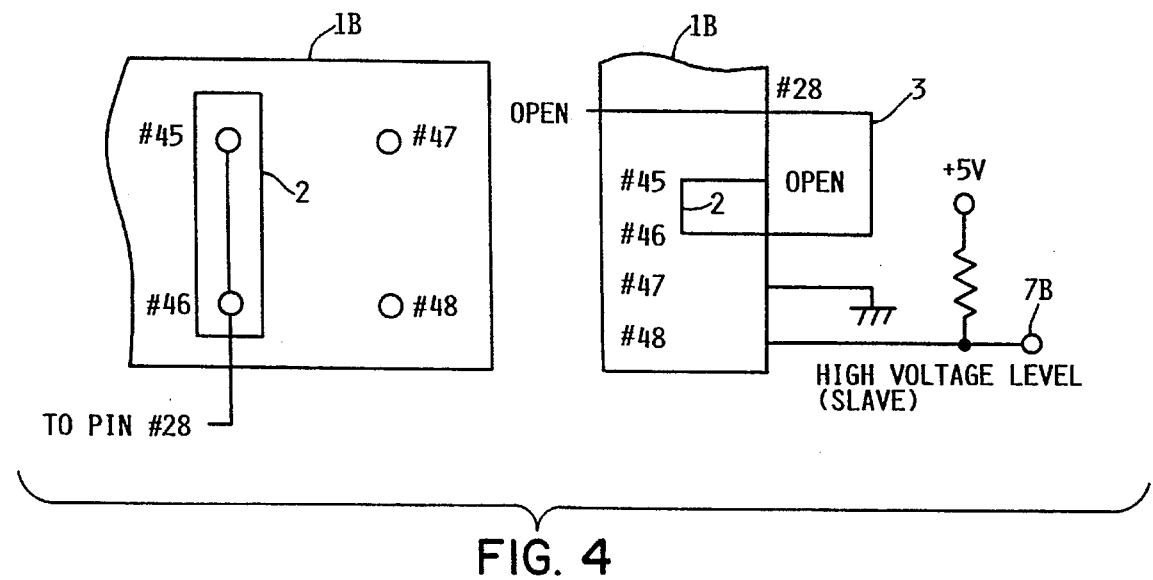
FIG. 4 is a diagram showing the specification of slave for local selection according to the present invention.

In the following, local selection and cable selection are described by reference to FIG. 3 to FIG. 6. FIG. 3 and FIG. 4 show local selection. For local selection, a master and a slave are selected without using cable selection. For cable selection, a master or slave is selected based on a potential at the interface line #28 without using local selection. The user may specify a master or slave by using either local or cable selection. Now it is assumed that the connector 1A of FIG. 3 is connected to the HDD 5 and the HDD 5 is specified as a master HDD or a first disk drive apparatus, and the connector 1B of FIG. 4 is connected to the HDD 6 and the HDD 6 is specified as a slave HDD or a second disk drive apparatus.

The connectors 1A and 1B have a plurality of connection points, or pins #1 to #44 connected to the interface lines #1 to #44, respectively. The pin #46 or a first connection point may be selectively connected to the interface line #28. That is, as shown in FIG. 2, the pin #46 of the connector 1A is connected to the interface line #28, and on the other hand, the pin #46 of the connector 1B is disconnected from the interface line #28 by the user, as indicated by the dotted line 5A. A potential at the pin #45 or a second connection point is an open potential. A potential at the pin #47 or a third connection point is tied to the reference potential. The pin #48 or a fourth connection point is tied to +5 V through a resistance.

Referring to FIG. 3, a jumper plug 2 is inserted into the pins #47 and #48 by the user to connect the pins #47 and #48. A potential at an output terminal 7A thus becomes the reference potential or a low voltage level. A controller (not shown) for the HDD 5 detects the low voltage level at the output terminal 7A, and thereby recognizes itself as a master.

Referring to FIG. 4, the jumper plug 2 is inserted into the pins #45 and #46 by the user. The jumper plug may not be connected to the above two pins. A potential at an output terminal 7B thus becomes +5 V (high voltage level). A controller (not shown) for the HDD 6 detects the high voltage level at the output terminal 7B, and thereby recognizes itself as a slave.

Since a master or slave is selected without using cable selection for local selection as described above, the pins #28 are not connected to the output terminals 7A and 7B in FIG. 3 and FIG. 4.

Figure 5:
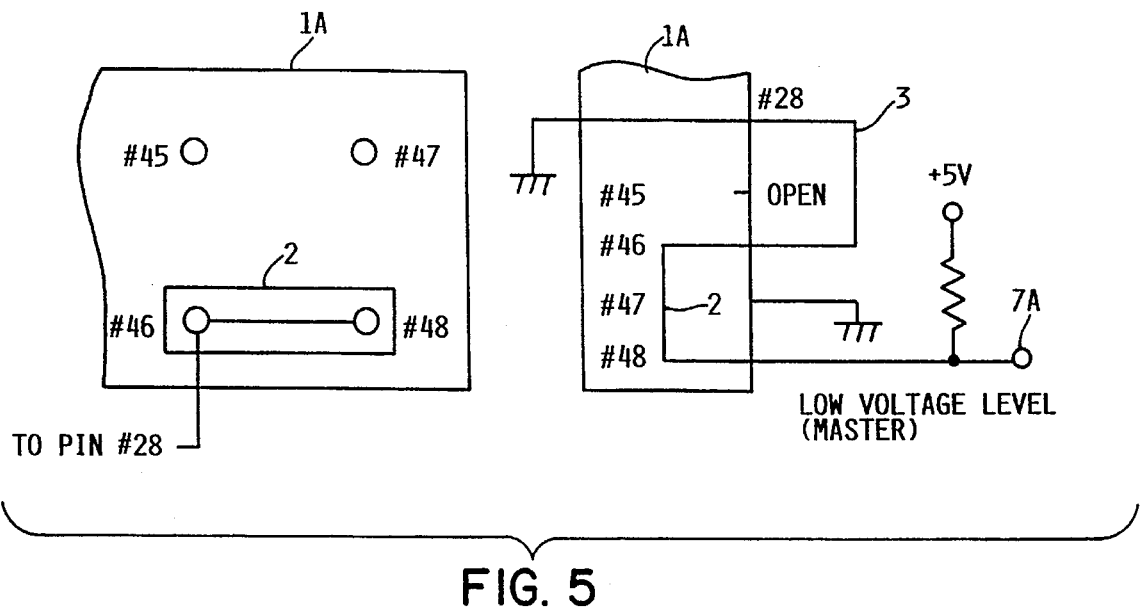
FIG. 5 is a diagram showing the specification of master for cable selection according to the present invention.
Figure 6:
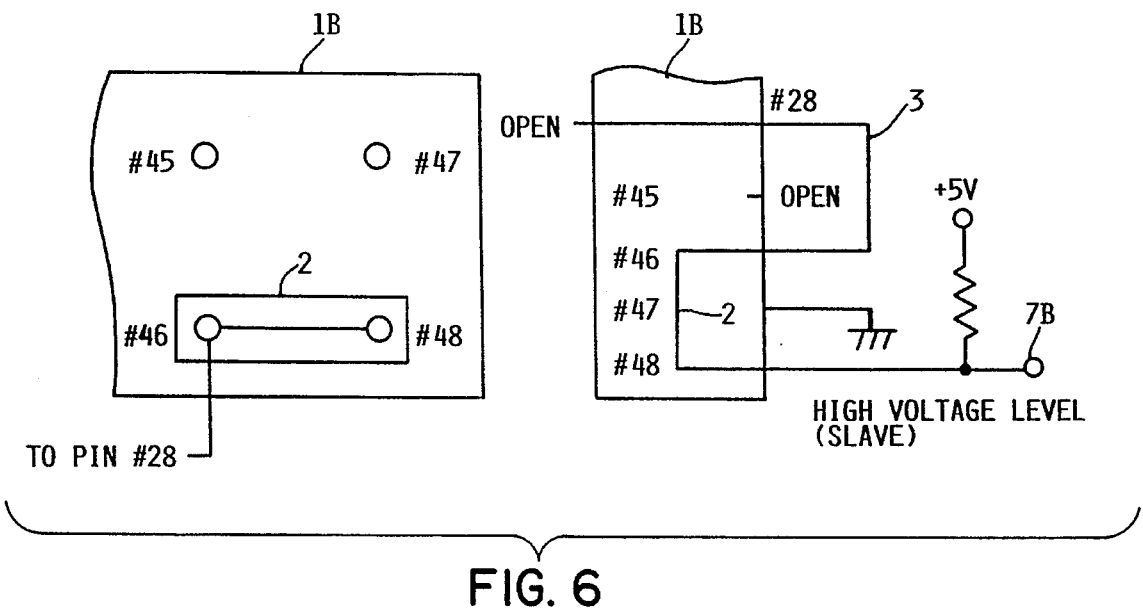
FIG. 6 is a diagram showing the specification of slave for cable selection according to the present invention.

FIG. 5 and FIG. 6 show cable selection. The connector 1A of FIG. 5 is the connector 1A shown in FIG. 2 and FIG. 3. In FIG. 5, the jumper plug 2 is inserted into the pins #46 and #48 by the user to connect the pins #46 and #48. Since the pins #28 and #46 are connected to each other through the connection line 3 according to the present invention and the pin #28 is tied to the reference potential of the personal computer, a potential at the output terminal 7A is the reference potential, or a low voltage level. The controller for the HDD 5 detects the low voltage level at the output terminal 7A, and thereby recognizes itself as a master.

The connector 1B of FIG. 6 is the connector 1B shown in FIG. 2 and FIG. 4. In FIG. 6, the jumper plug 2 is inserted into the pins #46 and #48 by the user to connect the pins #46 and #48. The pins #46 and #28 are connected to each other through the connection line 3 according to the present invention and a potential at the pin #28 of the connector 1B is an open voltage, or a floating voltage, as indicated by the dotted line 5A in FIG. 2. As is obvious from the connection of circuits in FIG. 6, a voltage at the output terminal 7B is +5 V, or the high voltage level. The controller for the HDD 6 detects the high voltage level at the output terminal 7B, and thereby recognizes itself as a slave.

According to the present invention, when the floating voltage or the open voltage is selected for cable selection, +5 V is generated which corresponds to a slave for local selection, at the output terminal 7B, and when 0 V is selected for cable selection, 0V is generated which corresponds to a master for local selection, at the output terminal 7A. This allows a controller for an HDD to detect only an output voltage at the output terminal 7A or 7B, whether local selection or cable selection. If an output voltage is 0 V or the low voltage level, that controller may recognize itself as a master, and if an output voltage is +5 V or the high voltage level, that controller may recognize itself as a slave.

Figure 7:
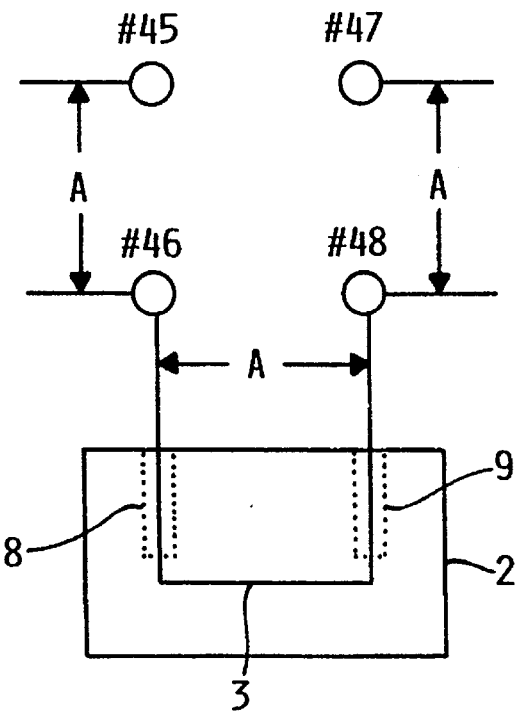
FIG. 7 is a diagram showing a jumper block used in the present invention.

As shown in FIG. 3, FIG. 4, FIG. 5, and FIG. 6, the pins #45, #46, #47, and #48 are arranged in a matrix. The jumper plugs 2 are inserted into the pins #47 and #48, the pins #45 and #46, and the pins #46 and #48, respectively. As shown in FIG. 7, a distance A between conductive accept members or a first and second jumper connection points 8 and 9 on the jumper plug 2 is equal to a distance between the pins #45 and #46, a distance between the pins 4#47 and #48, and a distance between the pins #46 and #48. As shown in FIG. 1, the pins #45, #46, #47, and #48 are provided close to the AT interface pins #1 to #44 of the connector, but not connected to the interface lines #1 to #44.

Figure 8:
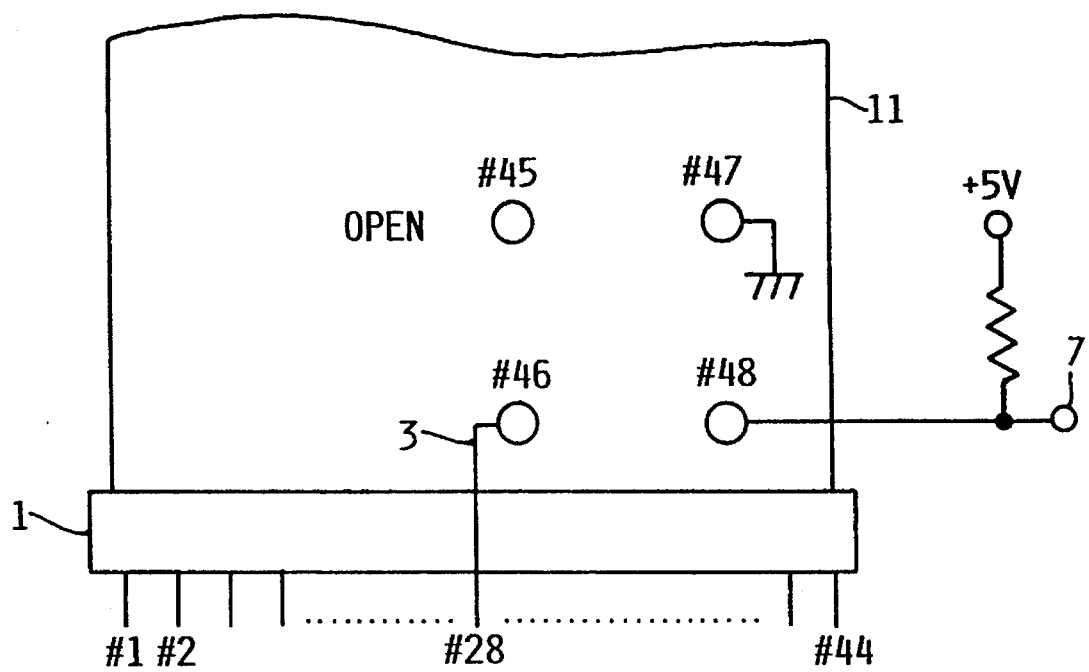
FIG. 8 is a diagram showing the attachment of pins #45 to #48 according to the present invention.

However, the pins #45 and #48 may be formed, as shown in FIG. 8, on a circuit board 11 connected with the connector 1. In this case, a distance between the pin #45 and #46, the pin #46 and #48, and the pin #47 and #48 is equal to the distance A in FIG. 7.

Figure 9:
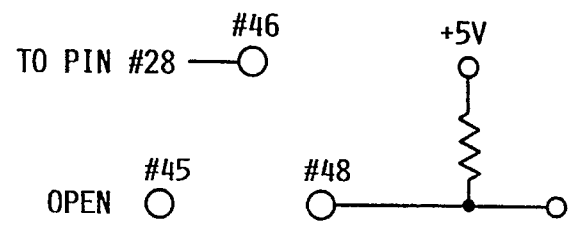
FIG. 9 is a diagram showing a switching device according to the present invention.

FIG. 9 shows another arrangement of the pins #45 to #48. The jumper plug 2 is inserted into the pins #46 and #48 by the user for cable selection, and inserted into the pins #45 and #48 when a slave is specified for local selection and inserted into the pins #47 and #48 when a master is specified for local selection. A distance between the pins #46 and #48, the pins #45 and #48, and the pins #47 and #48 is equal to the distance A in FIG. 7. It will be recognized that the pins #45 to #48 in FIG. 9 may be formed close to the interface pins #1 to #44 of the connector or may be formed on the circuit board, as shown in FIG. 8.

The jumper block is used to connect the pin #46 or the first connection point, the pin #45 or the second connection point, or the pin #47 or the third connection point to the pin #48 or the fourth connection point in FIG. 9. However, it will be appreciated that a single-pole triple-throw switch may be used instead of them.

Figure 10:
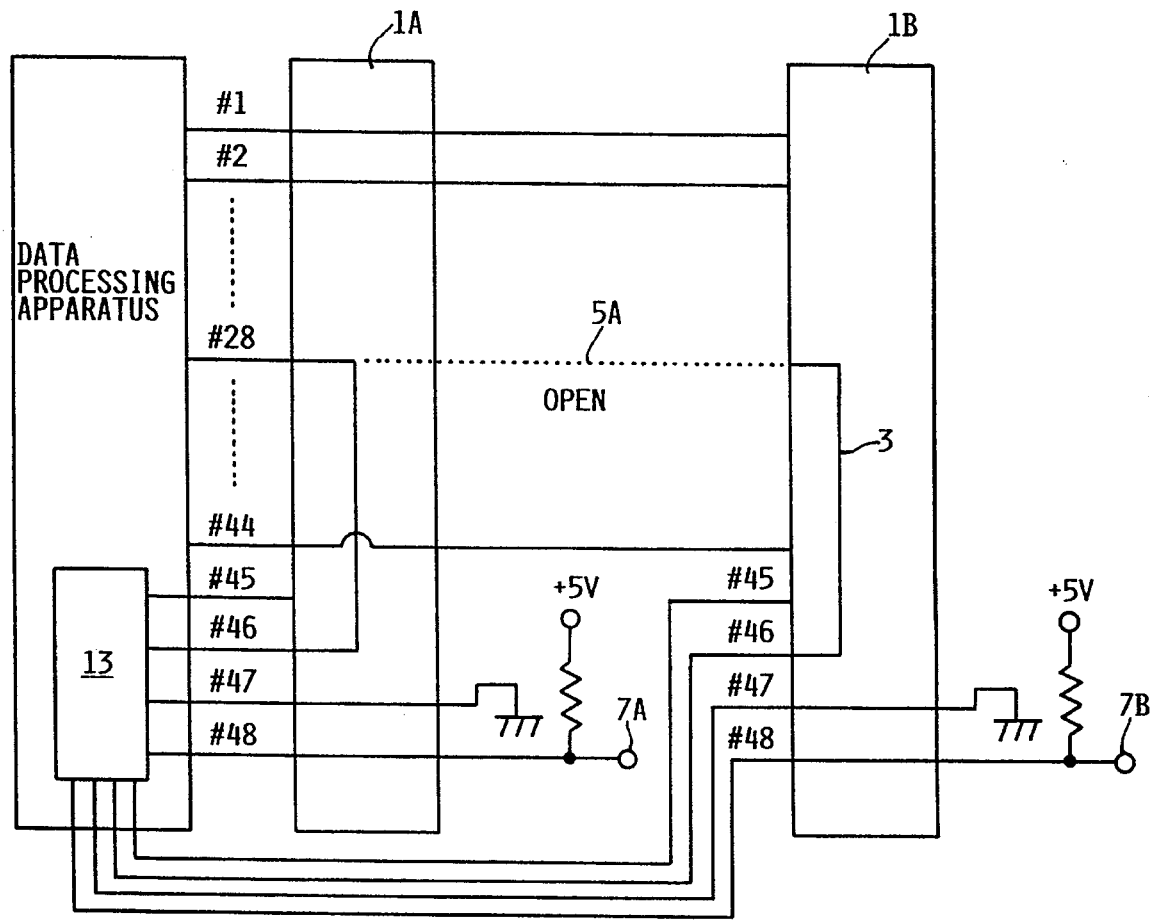
FIG. 10 is a diagram showing the switching device provided according to the present invention to a personal computer.

The pins #45 to #48 of the connectors 1A and 1B and the jumper block, or the single-pole triple-throw switch may be provided as a switching device 13 in a data processing device such as a personal computer as shown in FIG. 10. The switching device 13 may be implemented by an electronic switching circuit.

According to the present invention, one jumper block or one switching device enables the specification of a master and a slave for local selection and cable selection.

What is claimed is:

1. A disk drive apparatus connected to data processing means through a plurality of interface lines including one interface line connected to a first voltage level of said data processing means, said disk drive apparatus comprising:

a plurality of connection points connected respectively to said plurality of interface lines, a first connection point capable of being selectively connected to said one interface line, a second connection point kept at a floating voltage, a third connection point tied to the first voltage level, a fourth connection point tied to a second voltage level and selectively connected to one of said first, second, and third connection points, and control means connected to said fourth connection point, said control means detecting a voltage level of the fourth connection point, said control means designating said disk drive apparatus as one of a first disk drive apparatus or a second disk drive apparatus in response to the voltage level at said fourth connection point.

2. The disk drive apparatus according to claim 1, including a connector having a plurality of connection points connected respectively to said plurality of interface lines, wherein said first, second, third, and fourth connection points are proximate to said plurality of connection points on said connector.

3. The disk apparatus according to claim 2, wherein said one interface line is a cable selection line.

4. The disk drive apparatus according to claim 3, wherein said first voltage level is a reference voltage level.

5. The disk drive apparatus according to claim 1, including a circuit board, wherein said first, second, third and fourth connection points, and said control means are provided on said circuit board.

6. A disk drive apparatus including a connector which has a plurality of connection points each connected to one end of each of a plurality of interface lines each of which is connected to data processing means at the other end, said plurality of connection points including one connection point capable of being selectively connected to one end of one interface line having the other tied to a first voltage level of said data processing means, said connector including:

a first connection point connected to said one connection point, a second connection point kept at a floating voltage, a third connection point tied to the first voltage level, and a fourth connection point tied to a second voltage level, said disk drive apparatus including a jumper for connecting said fourth connection point to at least said first connection point or said third connection point and control means which is connected to said fourth connection point and recognizes itself as a first or second disk drive apparatus by detecting a voltage level at the fourth connection point.

7. The disk drive apparatus according to claim 6, wherein said first, second, third, and fourth connection points are formed by a first, second, third, and fourth connection pins, respectively, and said first, second, third, and fourth connection pins are provided close to said plurality of connection points.

8. The disk drive apparatus according to claim 7, wherein said jumper includes a first and second jumper connection points and a distance between said first and second jumper connection points is equal to a distance between said first and fourth connection pins and a distance between said third and fourth connection pins.

9. The disk drive apparatus according to claim 8, wherein a distance between said first and second jumper connection points is equal to a distance between said first and second connection points.

10. The disk drive apparatus according to claim 8, wherein said one interface line is one specified as a cable selection line.

11. The disk drive apparatus according to claim 9, wherein said first voltage level is a reference potential.

12. A personal computer connected to a disk drive apparatus through a plurality of interface lines including one interface line tied to a first voltage level, said disk drive apparatus including:

a plurality of connection points connected to a plurality of said respective interface lines, a first connection point capable of being selectively connected to said one interface line, a second connection point tied to a floating voltage, a third connection point tied to a first potential, a fourth connection point tied to a second potential, and control means connected to said fourth connection point, said control means designating said disk drive apparatus either as a first or second disk drive apparatus by detecting a potential of said fourth connection point, said personal computer being connected to said first, second, third, and fourth connection points, and including connection means for connecting the fourth connection point to said first, second, or third connection point.

* * * * *